United States Patent
Cypher (10) Patent No.: US 8,713,258 B1
(45) Date of Patent: Apr. 29, 2014

(54) ESTIMATING STACK DISTANCES

(75) Inventor: Robert Cypher, Saratoga, CA (US)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 13/233,327

(22) Filed: Sep. 15, 2011

(51) Int. Cl.
*G06F 12/08* (2006.01)

(52) U.S. Cl.
USPC .................................. 711/132; 711/E12.018

(58) Field of Classification Search
USPC ........................................... 711/132, E12.018
See application file for complete search history.

(56) References Cited

U.S. PATENT DOCUMENTS

| | | |
|---|---|---|
| 7,366,871 B2 | 4/2008 | Cypher |
| 7,373,480 B2 | 5/2008 | Cypher |

OTHER PUBLICATIONS

Bar-Yossef et al; Counting Distinct Elements in a Data Stream; 2002; 10; Proc. 6th Intl. Workshop on Randomization and Approximation Techniques.

*Primary Examiner* — Charles Rones
*Assistant Examiner* — Ryan Dare
(74) *Attorney, Agent, or Firm* — Fish & Richardson P.C.

(57) ABSTRACT

Methods, systems, and apparatus, including computer programs encoded on a computer storage medium, for estimating the stack distance of an access to a cache. In one aspect, a method includes determining a current estimate value of the stack distance. For each of K buckets, a minimum value and a maximum value are initialized, wherein each bucket corresponds to a range of possible fingerprint values for accesses. A first access is processed, including: determining a first fingerprint value for the first access; identifying a first bucket for the first access based on the first fingerprint value; and determining that the first fingerprint value is between the minimum value and the maximum value for the first bucket, and in response, increasing the current estimate value and adjusting the minimum value or the maximum value for the first bucket.

30 Claims, 6 Drawing Sheets

FIG. 4 current_estimate = 0

FIG. 5A current_estimate =
0 + (999/1) / (999) = 1

FIG. 5B current_estimate =
1 + (999/1) / (999 − 300 − 1) = 2.43

ESTIMATING STACK DISTANCES

BACKGROUND

The present disclosure relates to digital data processing and, in particular, to estimating stack distances.

Computer systems can use various techniques to estimate the number of unique elements in a set of elements that can include duplicate elements. For sets of elements that have large numbers of elements, it is useful or necessary to estimate the number of unique elements rather than exactly determine the number of unique elements because a computer system can be limited by computing resources, e.g., memory or processing time. Techniques to estimate the number of unique elements in a set of elements have been used to estimate stack distances.

SUMMARY

A cache system estimates stack distances for a given access to the cache. In various implementations, the system can determine a fingerprint for each access between the given access and a previous access to the same address. The system partitions the range of possible fingerprints into buckets and maintains a (min, max) pair per bucket. The system also maintains a current estimate of the stack distance. The system processes accesses and, for each processed access, adjusts the (min, max) pair for the fingerprint's bucket based on whether the fingerprint of the access falls inside or outside of the (min, max) pair. If the fingerprint falls inside the (min, max) pair, the system increases the current estimate.

In general, one aspect of the subject matter described in this specification can be embodied in methods that include the actions of initializing a current estimate value for an estimate of a stack distance of a later access to an address in a cache, the current estimate value indicating an estimate of a number of accesses to the cache having unique addresses between the later access to the address and an earlier access to the address; initializing, for each of K buckets wherein K is greater than zero, a minimum value and a maximum value for the bucket, wherein each bucket corresponds to a range of possible fingerprint values for the accesses, and wherein the minimum value for the bucket is based at least partly on a lowest fingerprint value in the range corresponding to the bucket and the maximum value for the bucket is based at least partly on a highest fingerprint value in the range corresponding to the bucket; processing at least a first access between the earlier access and the later access to update the current estimate value, including: determining a first fingerprint value for the first access; identifying a first bucket of the K buckets for the first access based on the first fingerprint value; determining that the first fingerprint value is between the minimum value and the maximum value for the first bucket; and responsive to determining that the first fingerprint value is between the minimum value and the maximum value for the first bucket, increasing the current estimate value and adjusting the minimum value or the maximum value for the first bucket.

These and other embodiments can optionally include one or more of the following features. Increasing the current estimate value comprises increasing the current estimate value by $$\frac{\frac{R}{K}}{\max(i) - \min(i) - 1},$$

wherein R is a total number of possible fingerprint values and max(i) is the maximum value for the bucket and min(i) is the minimum value for the bucket. Adjusting the minimum value or the maximum value for the first bucket comprises: if the first fingerprint value minus the minimum value is less than the maximum value minus the first fingerprint value, setting the minimum value to the first fingerprint value; and if the first fingerprint value minus the minimum value is greater than or equal to the maximum value minus the first fingerprint value, setting the maximum value to the first fingerprint value. The actions further include selecting and processing additional accesses between the earlier access and the later access until an end condition is reached. The actions further include estimating a total number of unique accesses between the earlier access and the later access based on the current estimate value and a number of processed accesses. The actions further include determining a plurality of additional estimates of stack distances of different accesses to different addresses; determining a stack distance histogram using the estimates of stack distances; and determining an estimate of a cache miss rate for the cache using the stack distance histogram. The actions further include adjusting the cache using the estimate of the cache miss rate. Determining the first fingerprint value for the first access comprises selecting a first address for the first access. Determining the first fingerprint value for the first access comprises hashing a first address for the first access. K is selected based on an amount of available memory.

In general, one aspect of the subject matter described in this specification can be embodied in methods that include the actions of determining a current estimate value, the current estimate value indicating an estimate of a number of unique elements in a non-empty set of elements; determining, for each of K buckets wherein K is greater than zero, a minimum value and a maximum value for the bucket, wherein each bucket corresponds to a range of possible fingerprint values for the elements, and wherein the minimum value for the bucket is based at least partly on a lowest fingerprint value in the range corresponding to the bucket and the maximum value for the bucket is based at least partly on a highest fingerprint value in the range corresponding to the bucket; processing at least a first element in the set, including: determining a first fingerprint value for the first element; identifying a first bucket of the K buckets for the first element based on the first fingerprint value; and determining that the first fingerprint value is between the minimum value and the maximum value for the first bucket, and in response, increasing the current estimate value and adjusting the minimum value or the maximum value for the first bucket. Other embodiments of this aspect include corresponding systems, apparatus, and computer program products.

These and other embodiments can optionally include one or more of the following features. Increasing the current estimate value comprises increasing the current estimate value by $$\frac{\frac{R}{K}}{\max(i) - \min(i) - 1},$$

wherein R is a total number of possible fingerprint values and max(i) is the maximum value for the bucket and min(i) is the minimum value for the bucket. Adjusting the minimum value or the maximum value for the first bucket comprises: if (the first fingerprint value minus the minimum value) is less than (the maximum value minus the first fingerprint value), setting the minimum value to the first fingerprint value; and if (the first fingerprint value minus the minimum value) is greater than or equal to (the maximum value minus the first fingerprint value), setting the maximum value to the first fingerprint value. The actions further include selecting and processing additional elements from the set until an end condition is reached. The actions further include estimating a total number of unique elements in the set based on the current estimate value and a number of processed elements. Determining the first fingerprint value for the first element comprises hashing the first element. Determining the first fingerprint value for the first element comprises selecting the first element's value. K is selected based on an amount of available memory. The elements are search queries and the set of elements is a set of search queries received by a server over a period of time. Each element corresponds to a cache line of a cache accessed during a window of time, and the actions further include optimizing the cache using the current estimate value.

Particular embodiments of the subject matter described in this specification can be implemented to realize one or more of the following advantages. A computer system can determine an estimation of the number of unique elements in a set using limited computing resources. The estimation can be more accurate than estimations made using conventional techniques. The system can use fewer computing resources in reaching an estimation with a certain accuracy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
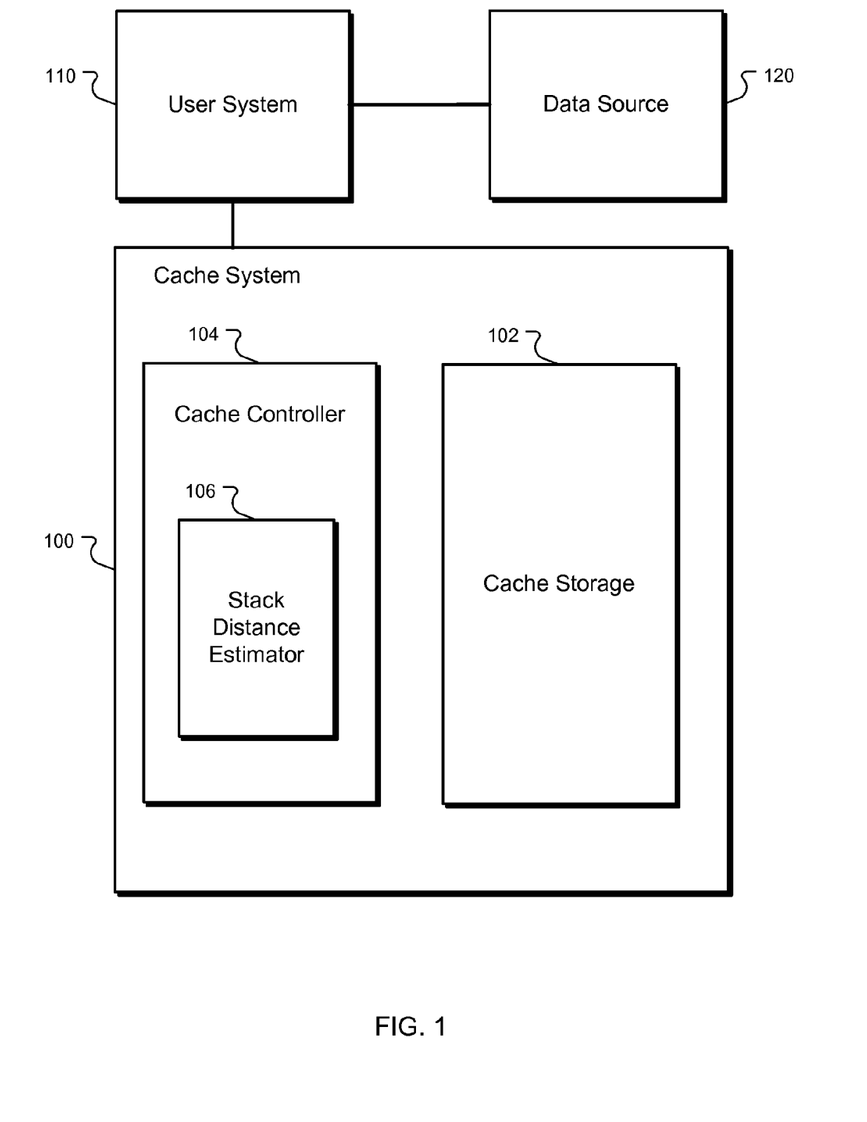
FIG. 1 is a schematic diagram of an example cache system and an example user system that uses the cache system.

FIG. 1 is a schematic diagram of an example cache system 100 and an example user system 110 that uses the cache system 100. The cache system 100 stores digital data from a data source 120 in cache storage 102. The user system 110 can access data in the cache system 100 more quickly than it can access data from the data source 120, so storing data in the cache system 100 can improve the performance of the user system 110.

The user system 110 can be, for example, a system of one or more computers, or a system of one or more processors. The cache system 100 can be, for example, a hardware cache or a software cache. For example, the data source 120 can be a remote computer system or storage device that the user system 110 accesses over a network, and the cache storage 102 can be local storage. In another example, the data source 120 can be a hard drive and the cache storage 102 can be Random Access Memory (RAM). In another example, the data source 120 can be RAM and the cache storage 102 can be on-chip storage for a processor of the user system 110.

The user system 110 or an optional cache controller 104 can determine what data to store in the cache storage 102. For purposes of illustration, the cache system 100 will be described as having a cache controller 104 that determines what data to store in the cache storage 102. The cache controller 104 can also perform other cache management functions, e.g., determining what old data should be removed from the cache storage 102 to make room for new data, or determining how much space to allocate for cache storage 102.

The cache controller 106 includes a stack distance estimator 106. The stack distance estimator 106 estimates stack distances for cache accesses by the user system 110. Stack distances are described further below with reference to FIG. 2. Estimating stack distances is described further below with reference to FIG. 4. The cache controller 104 uses the stack distance estimates to build a stack distance histogram and estimate a cache miss rate for the cache system 100. The cache controller 104 uses the cache miss rate to adjust the cache system 100, e.g., by increasing or decreasing the size of the cache storage 102. Adjusting a cache system is described further below with reference to FIG. 3.

Figure 2A:
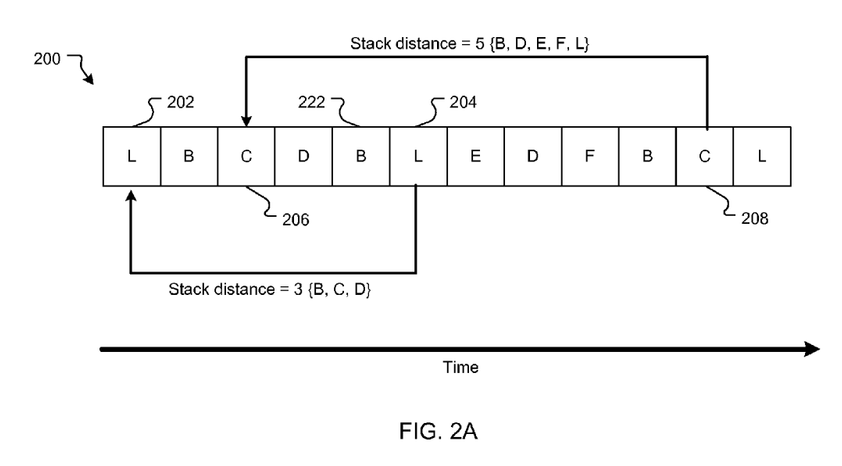
FIG. 2A is a schematic diagram of an example series of cache accesses.

FIG. 2A is a schematic diagram of an example series 200 of cache accesses. Each access is illustrated as a box marked by a letter. The letter indicates an address for the access. The addresses are of an appropriate granularity (e.g., page addresses, cacheline addresses.) The accesses are time ordered from left to right.

The stack distance of a given access A is determined by finding the last access A' before the given access A having the same address and counting the number of unique accesses between the given access A and the last access A'. If for a given access A there does not exist an earlier access A' to the same address, the stack distance of the given access A can be given a reserved value, e.g., a value that represents infinity. For example, consider the first and second accesses 202 and 204 to address L. There are four total accesses between the first and second accesses 202 and 204 (B, C, D, and B), and there are three unique accesses (B, C, and D.) So the stack distance of the second access 204 is three. For another example, consider the first and second accesses 206 and 208 to address C. There are seven total accesses between the first and second accesses 206 and 208 (D, B, L, E, D, F, and B), and there are five unique accesses (B, D, E, F, L.) So the stack distance of the second access 208 is five.

Figure 2B:
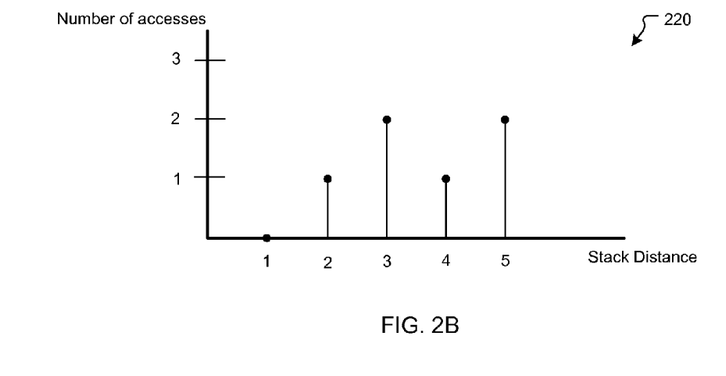
FIG. 2B is a graphical representation of an example stack distance histogram for the example series of cache accesses.

FIG. 2B is a graphical representation of an example stack distance histogram 220 for the example series 200 of cache accesses. Stack distances are on the horizontal axis and the number of accesses having each stack distance are on the vertical axis. For example, consider the stack distance two. The stack distance histogram 220 indicates that, for the stack distance two, there was one access having that stack distance. The access is the second access 222 from the example series 200 to the address B. Generating a stack distance histogram does not require creating a graphical representation of the stack distance histogram.

Figure 3:
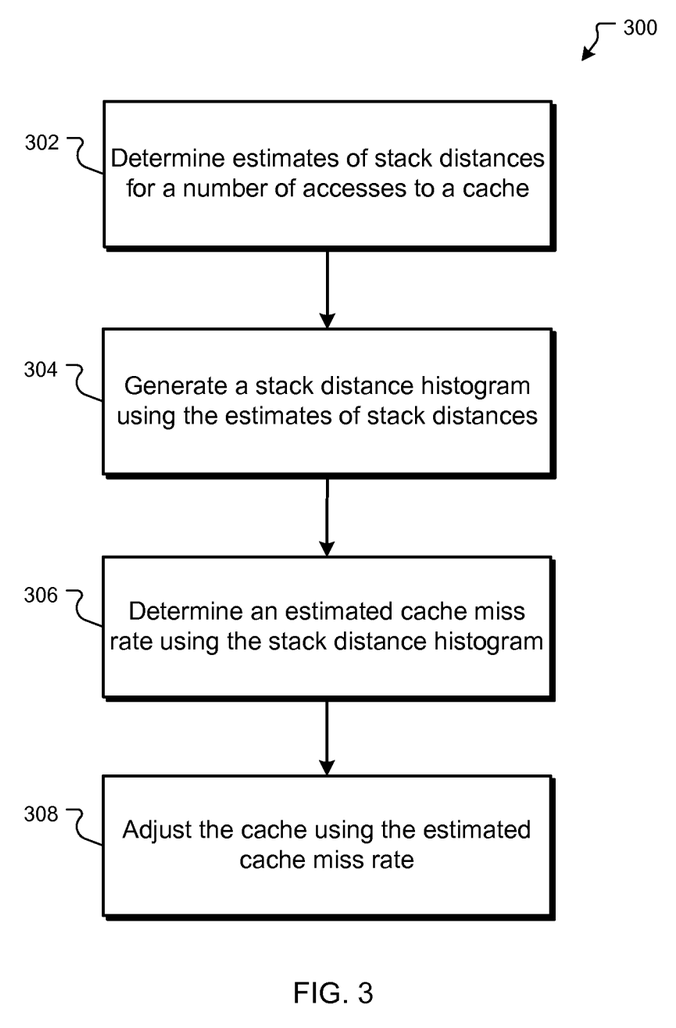
FIG. 3 is a flow diagram of an example process for adjusting a cache.

FIG. 3 is a flow diagram of an example process 300 for adjusting a cache. The process 300 is performed, for example, by a user system (e.g., user system 110 in FIG. 1) or a cache controller (e.g., cache controller 104 in FIG. 1.) For purposes of illustration, the process 300 will be described with reference to a cache controller that performs the process.

The cache controller determines estimates of stack distances for a number of accesses to the cache (302). For example, the accesses can be all of the accesses made during a period of time, all of the accesses made by a particular application, a sampling of accesses made during a period of time, and so on. In general, increasing the number of estimates of stack distances results in increased accuracy of the cache miss rate that will be determined in stage 306. The cache controller can determine an estimate of a stack distance using the process 400 illustrated in FIG. 4.

The cache controller generates a stack distance histogram using the estimates of stack distances (304). A stack distance histogram is data that represents a collection of stack distances and the number of accesses having those stack distances. For each stack distance of the various estimates of stack distances determined in stage 302, the cache controller estimates the number of accesses having that stack distance, resulting in the stack distance histogram.

The cache controller determines an estimated cache miss rate for the cache using the stack distance histogram (306). The estimated cache miss rate characterizes the frequency at which accesses will be attempted at the cache but fail because the requested data is not in the cache. For example, the cache miss rate can be expressed as a number of cache misses divided by a total number of accesses. If the cache is a fully-associative cache with a least-recently-used replacement policy, and if the cache has the ability to hold R records of the appropriate type (e.g., pages or cache lines), then the miss rate for the cache can be estimated as the fraction of accesses which have a stack distance of greater than R.

The cache controller adjusts the cache using the estimated cache miss rate (308). For example, the cache controller can increase or decrease the size of the cache using the estimated cache miss rate (e.g., where the size of the cache can be adjusted, e.g. by allocating more memory to the cache.) If the cache miss rate is higher than a desired miss rate, the cache controller can increase the size of the cache. The cache controller can adjust the size of the cache by balancing a cost function against the estimated cache miss rate. For example, the cost function can relate cache sizes to costs, where typically a larger cache will have a larger cost. In some applications, the marginal benefits (e.g., lowering the cache miss rate) of increasing the size of the cache will decrease as the size of the cache is increased.

In some cases, the cache is implemented in hardware, and the size of the cache used in the next generation of hardware can be determined by using the stack distance histograms from the current generation of hardware. In other cases, the cache is implemented in software, and the software can dynamically modify the size of the cache.

Figure 4:
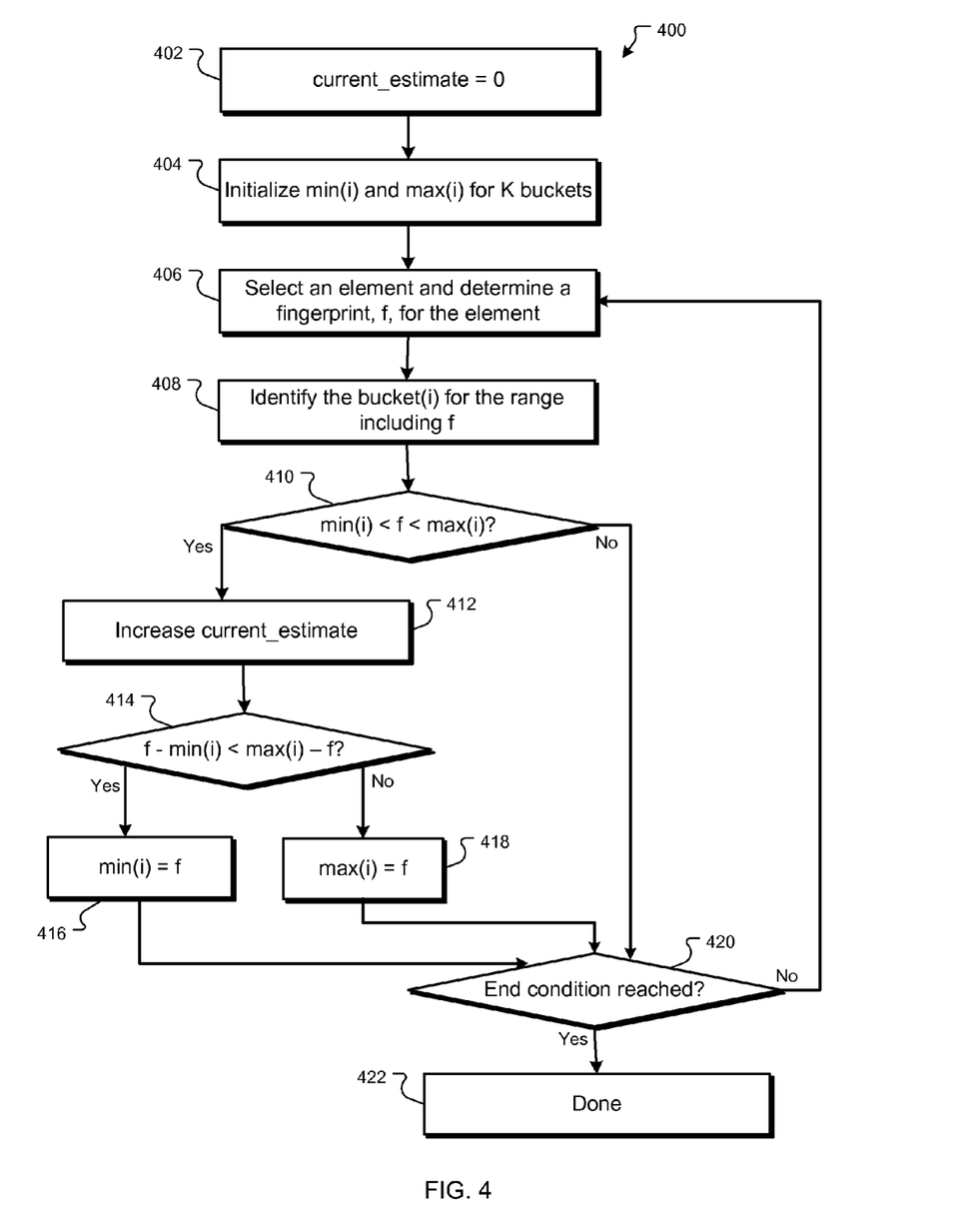
FIG. 4 is a flow diagram of an example process for estimating the number of unique elements in a set of elements.

FIG. 4 is a flow diagram of an example process 400 for estimating the number of unique elements in a set of elements. The process 400 is performed, for example, by a system of one or more computers. For purposes of illustration, the process 400 will be described with reference to a system that performs the process 400.

An element is anything that can be represented or referred to by a number in a data processing apparatus. The set of elements can be, for example, a set of electronic documents (e.g., web pages, images, audio files, and so on), a set of terms in one or more electronic documents (e.g., titles of web pages), a table including various data entries (e.g., a table of financial data), a set of advertisements, and so on. A set of elements includes one or more elements. Each element in the set is represented by a value. For example, an element that is one or more words can be represented by a value based on characters of the words.

The system determines fingerprints for elements in the set. Typically, the system determines fingerprints for some, but not all, of the elements; for example, the system can select elements randomly, or in an order, until an end condition is reached. The system determines fingerprints in a systematic way, e.g., by applying a formula or process to values of elements. A fingerprint of an element is any value that is based on the value of the element according to the systematic process. For example, a fingerprint can be the value for the element (e.g., the value is taken without any further processing), the result of applying a hash function to the value of the element, and so on. One example hash function results in a 64-bit value, where each of the 64 bits is the exclusive-or of a set of bits in the value for the element. Another example hash function views the value for the element as a binary number (based on, e.g., bits in the value for the element) and results in the product of that binary number and a fixed constant modulo a fixed prime number (e.g., a large prime number). The system can use various conventional hash functions and fingerprint functions.

Determining fingerprints for the elements results in a range of fingerprint values. For example, the fingerprint values for the elements can be randomly distributed across a range of fingerprint values. Other ranges of fingerprint values are possible. For purposes of illustration, the range of fingerprint values will be described as 1 ... R, where R is the number of possible fingerprint values. R is based on the range of possible element values and the specific technique used in determining fingerprints for the elements.

The system initializes a value for the current estimate of the number of unique elements in a given set (402). For example, the system can use or define a variable current_estimate and set the initial value of current_estimate to zero.

The system initializes minimum and maximum values for K buckets (404). K is a predetermined value. The value selected for K can vary depending the application of the process 400. K can be based on an amount of memory or other computing resources, for example, or a desired accuracy of the estimate. The desired accuracy can vary across applications, and a higher value for K can produce an estimate of greater accuracy. Each bucket corresponds to a continuous or non-continuous range of possible fingerprint values for the elements. Taken together, the buckets cover the range 0 ... R of possible fingerprint values. The buckets can cover equally sized ranges. The buckets are not typically overlapping.

The system maintains minimum and maximum values for each bucket. For purposes of illustration, each bucket is referred to as bucket(i), with a value for (i) designating a specific bucket of the K buckets. The minimum and maximum values for a bucket(i) are referred to as min(i) and max(i).

In some implementations, the system initializes min(i) based on the lowest fingerprint value in the range corresponding to bucket(i). For example, the system can set min(i) to one less than the lowest fingerprint value in the range. Similarly, the system can initialize max(i) based on the highest fingerprint value in the range corresponding to bucket(i). For example, the system can set max(i) to one more than the highest fingerprint value in the range. Consider an example bucket corresponding to the range of fingerprint values from 100 to 199. The system can set min(i) to 99 and max(i) to 200.

The system selects an element and determines the fingerprint, f, for the element (406). For example, if the elements are terms in documents of a corpus of documents, the system can select the next term in a document. If the elements are queries received by a search engine, the system can select the next query received by the search engine. In implementations where the system uses a hash function to determine fingerprint values, then the system applies the hash function to the selected element. Other ways of selecting elements are possible.

The system identifies the bucket(i) for the range including the fingerprint value f (408). For example, the system can search the buckets for the bucket corresponding to the range, e.g., using a conventional search technique. Alternatively, each bucket can correspond to fingerprints that differ in the X least significant bits for some value X, so that the index "i" of the bucket containing the fingerprint can be obtained by discarding the X least significant bits of the fingerprint.

The system determines whether the fingerprint value is between min(i) and max(i) for the bucket (410). If it is not, then the system does not change the value of current estimate, min(i), or max(i) and proceeds to stage 120. If the fingerprint value is between min(i) and max(i), then the system adjusts the value of current estimate and either min(i) or max(i) by proceeding to stage 112.

The system increases current estimate (412). In some implementations, the system increases current_estimate by $$\frac{\frac{R}{K}}{\max(i) - \min(i) - 1}.$$

This factor reflects the fact that, as max(i) and min(i) become closer in value, selected elements that fall between max(i) and min(i) represent a greater number of unique elements in the set.

The system adjusts either min(i) or max(i) (414-418). In some implementations, the system determines whether f−min(i)<max(i)−f (414). If it is, the system sets min(i) to the fingerprint value f. If it is not, the system sets max(i) to the fingerprint value f.

The system determines whether an end condition has been reached (420). For example, the system can determine whether a certain number of elements have been selected, whether the current_estimate value changed more than a threshold amount the last time it was adjusted, whether a certain amount of time has passed, and so on. If the end condition is reached, the process terminates (422). The current_estimate value provides an estimate of the number of unique elements in the set. Otherwise, the system selects another element (return to 406).

In some implementations, the system performs additional statistical calculations to determine the estimate. For example, the system can use the current_estimate value and the number of elements processed to determine a final estimate of the number of unique elements in the set. The system uses the final estimate in a number of different ways depending on the application. For example, the system can store the final estimate, transmit the final estimate, or adjust another system parameter based on the final estimate.

Using a computer system to estimate the number of unique elements in a set has a wide variety of applications. For example, various database operations rely on counting or estimating the number of unique elements in a column of a relational table of data (e.g., where the elements are financial numbers, operational records, or the like). In another example, a network router gathers statistical information regarding traffic flowing through the router (e.g., the number of unique destination addresses) despite having limited memory.

The process 400 can be used (e.g., by the user system 110 or cache controller 104 of FIG. 1) to estimate the stack distance of a cache access. An access to the cache (to an address of appropriate granularity) is considered an element. Since the stack distance of an access A to an address L is the number of unique accesses between access A and the previous access A' to address L, the process 400 can be used to estimate the number of unique accesses between A and A' and hence the stack distance of A.

Figure 5A:
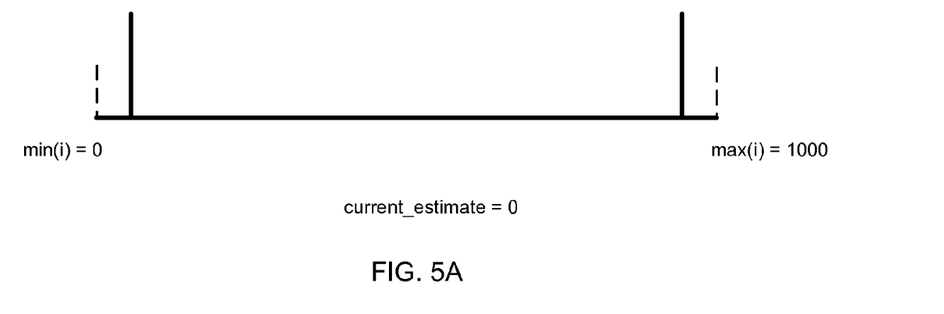
FIGS. 5A-5C illustrate processing example elements from a set using the process illustrated in FIG. 4.
Figure 5B:
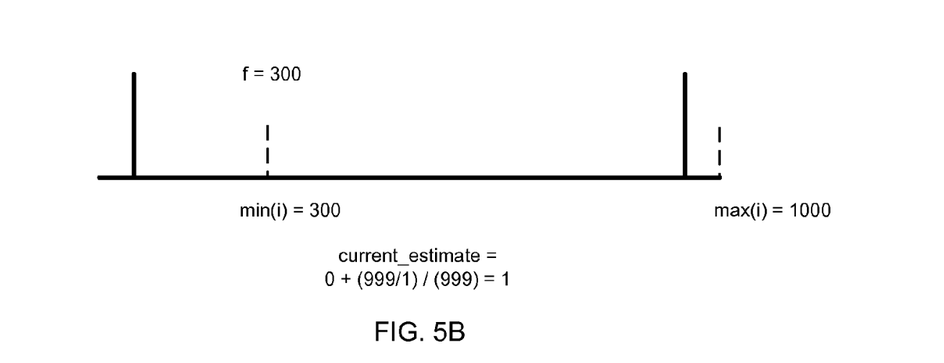
Figure 5C:
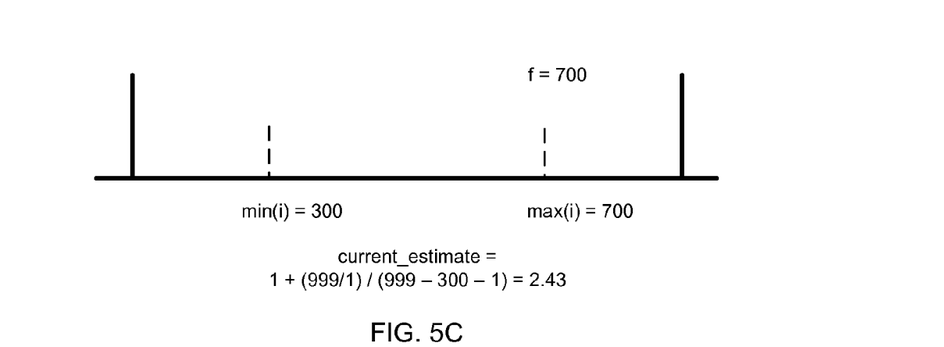

FIGS. 5A-5C illustrate processing example elements from a set using the process 400 illustrated in FIG. 4. Consider an example set of elements having a fingerprint range of 1 to 999. Suppose that the system partitions the range into a single bucket corresponding to the range from 1 to 999.

FIG. 5A illustrates the bucket before any elements are processed. A current_estimate value is initialized to zero, min(i) for the bucket is set to 0, and max(i) for the bucket is set to 1000.

FIG. 5B illustrates the bucket after a first element is processed having a fingerprint value of f=300. The fingerprint value is between min(i) and max(i), so current_estimate is increased and either min(i) or max(i) is adjusted. As shown, current_estimate is increased by a value of $$\frac{\frac{999}{1}}{1000 - 0 - 1} = 1.$$

Because the fingerprint value is closer to min(i) than it is max(i), min(i) is set to the fingerprint value.

FIG. 5C illustrates the bucket after another element is processed having a fingerprint value of f=700. Other elements having fingerprint values less than min(i) can have been processed prior to processing the element having a fingerprint of 700; however, processing those elements would not have resulted in different values for current_estimate, min(i), or max(i). The fingerprint value of 700 is between min(i) and max(i), so current_estimate is increased and either min(i) or max(i) is adjusted. As shown current_estimate is increased by a value of $$\frac{\frac{999}{1}}{999 - 300 - 1} = 1.43,$$

resulting in a current_estimate value of 2.43. Because the fingerprint value is closer to max(i) than it is to min(i), max(i) is set to the fingerprint value.

Figure 6:
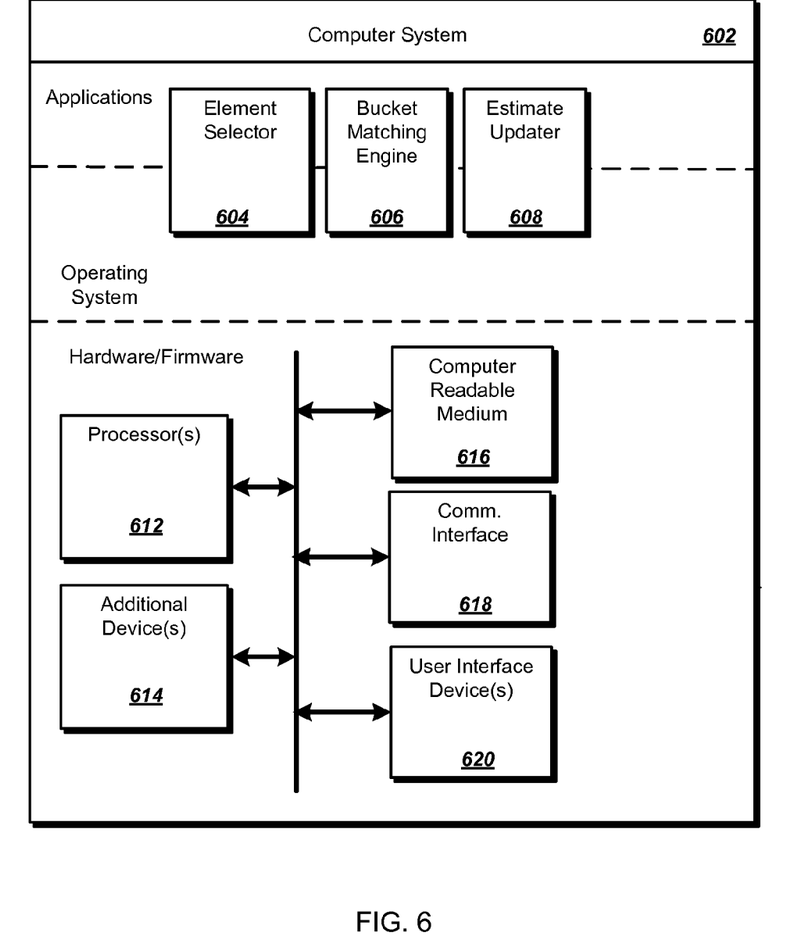
FIG. 6 is a schematic diagram of an example computer system configured to determine an estimate of the number of unique elements in a set.

FIG. 6 is a schematic diagram of an example computer system 602 configured to determine an estimate of the number of unique elements in a set. The system 602 includes one or more data processing apparatus. The system 602 includes various modules, e.g. executable software programs, including an element selector 604, a bucket matching engine 606, and an estimate updater 608. The element selector 604 is configured to select elements from the set. The bucket matching engine 606 is configured to match selected elements with corresponding buckets. The estimate updater 608 is configured to update a current estimate of the number of unique elements based on selected elements. The estimate updater 608 can also be configured to update minimum and maximum values for buckets.

Each module runs as part of the operating system on the system 602, runs as an application on the system 602, or runs as part of the operating system and part of an application on the system 602, for instance. Although several software modules are illustrated, there can be fewer or more software modules. Moreover, the software modules can be distributed on one or more data processing apparatus connected by one or more networks or other suitable communication mediums.

The system 602 also includes hardware or firmware devices including one or more processors 612, one or more additional devices 614, a computer readable medium 616, a communication interface 618, and one or more user (optional) interface devices 620. Each processor 612 is capable of processing instructions for execution within the system 602. Each processor 612 is capable of processing instructions stored on the computer readable medium 616 or on a storage device such as one of the additional devices 614. Examples of user interface devices 620 include a display, a camera, a speaker, a microphone, a tactile feedback device, a keyboard, and a mouse. The system 602 can store instructions that implement operations associated with the modules described above, for example, on the computer readable medium 616 or one or more additional devices 614, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
   initializing a current estimate value for an estimate of a stack distance of a later access to an address in a cache, the current estimate value indicating an estimate of a number of accesses to the cache having unique addresses between the later access to the address and an earlier access to the address;
   initializing, for each of K buckets wherein K is greater than zero, a minimum value and a maximum value for the bucket, wherein each bucket corresponds to a range of possible fingerprint values for the accesses, and wherein the minimum value for the bucket is based at least partly on a lowest fingerprint value in the range corresponding to the bucket and the maximum value for the bucket is based at least partly on a highest fingerprint value in the range corresponding to the bucket; and
   processing at least a first access between the earlier access and the later access to update the current estimate value, including:
      determining a first fingerprint value for the first access;
      identifying a first bucket of the K buckets for the first access based on the first fingerprint value;
      determining that the first fingerprint value is between the minimum value and the maximum value for the first bucket; and
      responsive to determining that the first fingerprint value is between the minimum value and the maximum value for the first bucket, increasing the current estimate value and adjusting the minimum value or the maximum value for the first bucket.

2. The method of claim 1, wherein increasing the current estimate value comprises increasing the current estimate value by $$\frac{\frac{R}{K}}{\max(i) - \min(i) - 1},$$

wherein R is a total number of possible fingerprint values and max(i) is the maximum value for the bucket and min(i) is the minimum value for the bucket.

3. The method of claim 1, wherein adjusting the minimum value or the maximum value for the first bucket comprises:
   if the first fingerprint value minus the minimum value is less than the maximum value minus the first fingerprint value, setting the minimum value to the first fingerprint value; and
   if the first fingerprint value minus the minimum value is greater than or equal to the maximum value minus the first fingerprint value, setting the maximum value to the first fingerprint value.

4. The method of claim 1, further comprising:
  selecting and processing additional accesses between the earlier access and the later access until an end condition is reached.

5. The method of claim 4, further comprising:
  estimating a total number of unique accesses between the earlier access and the later access based on the current estimate value and a number of processed accesses.

6. The method of claim 5, further comprising:
  determining a plurality of additional estimates of stack distances of different accesses to different addresses;
  determining a stack distance histogram using the estimates of stack distances; and
  determining an estimate of a cache miss rate for the cache using the stack distance histogram.

7. The method of claim 6, further comprising adjusting the cache using the estimate of the cache miss rate.

8. The method of claim 1, wherein determining the first fingerprint value for the first access comprises selecting a first address for the first access.

9. The method of claim 1, wherein determining the first fingerprint value for the first access comprises hashing a first address for the first access.

10. The method of claim 1, wherein K is selected based on an amount of available memory.

11. A system comprising one or more data processing apparatus configured to perform operations comprising:
  initializing a current estimate value for an estimate of a stack distance of a later access to an address in a cache, the current estimate value indicating an estimate of a number of accesses to the cache having unique addresses between the later access to the address and an earlier access to the address;
  initializing, for each of K buckets wherein K is greater than zero, a minimum value and a maximum value for the bucket, wherein each bucket corresponds to a range of possible fingerprint values for the accesses, and wherein the minimum value for the bucket is based at least partly on a lowest fingerprint value in the range corresponding to the bucket and the maximum value for the bucket is based at least partly on a highest fingerprint value in the range corresponding to the bucket;
  processing at least a first access between the earlier access and the later access to update the current estimate value, including:
    determining a first fingerprint value for the first access;
    identifying a first bucket of the K buckets for the first access based on the first fingerprint value;
    determining that the first fingerprint value is between the minimum value and the maximum value for the first bucket; and
    responsive to determining that the first fingerprint value is between the minimum value and the maximum value for the first bucket, increasing the current estimate value and adjusting the minimum value or the maximum value for the first bucket.

12. The system of claim 11, wherein increasing the current estimate value comprises increasing the current estimate value by $$\frac{\frac{R}{K}}{\max(i) - \min(i) - 1},$$

wherein R is a total number of possible fingerprint values and max(i) is the maximum value for the bucket and min(i) is the minimum value for the bucket.

13. The system of claim 11, wherein adjusting the minimum value or the maximum value for the first bucket comprises:
  if the first fingerprint value minus the minimum value is less than the maximum value minus the first fingerprint value, setting the minimum value to the first fingerprint value; and
  if the first fingerprint value minus the minimum value is greater than or equal to the maximum value minus the first fingerprint value, setting the maximum value to the first fingerprint value.

14. The system of claim 11, the operations further comprising:
  selecting and processing additional accesses between the earlier access and the later access until an end condition is reached.

15. The system of claim 14, the operations further comprising:
  estimating a total number of unique accesses between the earlier access and the later access based on the current estimate value and a number of processed accesses.

16. The system of claim 15, the operations further comprising:
  determining a plurality of additional estimates of stack distances of different accesses to different addresses;
  determining a stack distance histogram using the estimates of stack distances; and
  determining an estimate of a cache miss rate for the cache using the stack distance histogram.

17. The system of claim 16, the operations further comprising adjusting the cache using the estimate of the cache miss rate.

18. The system of claim 11, wherein determining the first fingerprint value for the first access comprises selecting a first address for the first access.

19. The system of claim 11, wherein determining the first fingerprint value for the first access comprises hashing a first address for the first access.

20. The system of claim 11, wherein K is selected based on an amount of available memory.

21. A non-transitory computer storage medium encoded with a computer program, the program comprising instructions that when executed by one or more computers cause the one or more computers to perform operations comprising:
  initializing a current estimate value for an estimate of a stack distance of a later access to an address in a cache, the current estimate value indicating an estimate of a number of accesses to the cache having unique addresses between the later access to the address and an earlier access to the address;
  initializing, for each of K buckets wherein K is greater than zero, a minimum value and a maximum value for the bucket, wherein each bucket corresponds to a range of possible fingerprint values for the accesses, and wherein the minimum value for the bucket is based at least partly on a lowest fingerprint value in the range corresponding to the bucket and the maximum value for the bucket is based at least partly on a highest fingerprint value in the range corresponding to the bucket;
  processing at least a first access between the earlier access and the later access to update the current estimate value, including:
    determining a first fingerprint value for the first access;

identifying a first bucket of the K buckets for the first access based on the first fingerprint value;

determining that the first fingerprint value is between the minimum value and the maximum value for the first bucket; and responsive to determining that the first fingerprint value is between the minimum value and the maximum value for the first bucket, increasing the current estimate value and adjusting the minimum value or the maximum value for the first bucket.

22. The computer storage medium of claim 21, wherein increasing the current estimate value comprises increasing the current estimate value by $$\frac{\frac{R}{K}}{\max(i) - \min(i) - 1},$$

wherein R is a total number of possible fingerprint values and max(i) is the maximum value for the bucket and min(i) is the minimum value for the bucket.

23. The computer storage medium of claim 21, wherein adjusting the minimum value or the maximum value for the first bucket comprises:

if the first fingerprint value minus the minimum value is less than the maximum value minus the first fingerprint value, setting the minimum value to the first fingerprint value; and if the first fingerprint value minus the minimum value is greater than or equal to the maximum value minus the first fingerprint value, setting the maximum value to the first fingerprint value.

24. The computer storage medium of claim 21, the operations further comprising:

selecting and processing additional accesses between the earlier access and the later access until an end condition is reached.

25. The computer storage medium of claim 24, the operations further comprising:

estimating a total number of unique accesses between the earlier access and the later access based on the current estimate value and a number of processed accesses.

26. The computer storage medium of claim 25, the operations further comprising:

determining a plurality of additional estimates of stack distances of different accesses to different addresses;

determining a stack distance histogram using the estimates of stack distances; and determining an estimate of a cache miss rate for the cache using the stack distance histogram.

27. The computer storage medium of claim 26, the operations further comprising adjusting the cache using the estimate of the cache miss rate.

28. The computer storage medium of claim 21, wherein determining the first fingerprint value for the first access comprises selecting a first address for the first access.

29. The computer storage medium of claim 21, wherein determining the first fingerprint value for the first access comprises hashing a first address for the first access.

30. The computer storage medium of claim 21, wherein K is selected based on an amount of available memory.

* * * * *